United States Patent [19]
Esposito et al.

[11] Patent Number: 5,743,315
[45] Date of Patent: Apr. 28, 1998

[54] METHOD FOR CUTTING TREES AND GRINDING AND MULCHING TREE STUMPS

[76] Inventors: Pasquale A. Esposito; Patsy A. Esposito, Jr.; Wayne J. Esposito, all of P.O. Box 6, Davenport, Fla. 33837

[21] Appl. No.: 845,921

[22] Filed: Apr. 28, 1997

Related U.S. Application Data

[63] Continuation of Ser. No. 425,936, Apr. 19, 1995, Pat. No. 5,499,771, and a continuation of Ser. No. 579,152, Dec. 27, 1995, Pat. No. 5,641,129.

[51] Int. Cl.⁶ .................................................. A01G 23/06
[52] U.S. Cl. .................. 144/334; 144/24.13; 241/101.74
[58] Field of Search ........................... 144/24.13, 34.1, 144/162.1, 172, 174, 334; 241/101.74, 101.76

[56] References Cited

U.S. PATENT DOCUMENTS

| | | | |
|---|---|---|---|
| 3,732,905 | 5/1973 | Pickel | 144/24.12 |
| 3,937,261 | 2/1976 | Blum | 144/24.12 |
| 4,848,423 | 7/1989 | Yoder | 144/24.12 |

*Primary Examiner*—W. Donald Bray
*Attorney, Agent, or Firm*—George A. Bode; Daniel E. Maddux; Bode & Associates

[57] ABSTRACT

Disclosed is an apparatus and a method for cutting trees and grinding and mulching tree stumps. The apparatus includes a semi-spherical arcuate shield with a control mount and a foot mount attached to the arcuate shield. A cylindrical drum having cutting teeth mounted on the periphery of the drum is mounted below the arcuate shield such that the arcuate shield covers the upper forward and rearward surfaces of the drum. The method of the present invention includes grinding the upper portion of a tree trunk with a cylindrical drum with cutting teeth until substantially all of the tree trunk is cut away, pushing the apparatus against the tree trunk at a point above the ground away portion of the tree trunk until the upper portion of the tree trunk breaks off, grinding the resulting tree stump down to ground level with the cylindrical drum with cutting teeth, and depositing the tree cuttings from the tree stump around the tree stump. Preferably, the apparatus engages the tree trunk at a point that is 90% of the height of the tree trunk.

11 Claims, 5 Drawing Sheets

METHOD FOR CUTTING TREES AND GRINDING AND MULCHING TREE STUMPS

This is a continuation of application Ser. No. 08/425,936 (now U.S. Pat. No. 5,499,771), filed Apr. 19, 1995; and, Ser. No. 08/579,152, filed Dec. 27, 1995, now U.S. Pat. No. 5,641,129.

BACKGROUND OF THE INVENTION

1. Field of the Invention

The present invention relates to an apparatus for cutting trees and grinding and mulching tree stumps, and more particularly an attachment mounted on a self-propelled vehicle which cuts trees and grinds and mulches the resulting tree stumps, and a method of cutting trees and grinding and mulching the resulting tree stumps.

2. General Background

Several devices have been patented which are aimed at grinding tree stumps.

U.S. Pat. No. 4,041,996 issued to Ram Industries, Inc., on Aug. 16, 1977, and entitled "Stump Eradicator" teaches a tree stump cutter having a rotating cylinder or drum having spaced and staggered cutters around its periphery, the drum being supported by a boom and pivoting arm controlled by hydraulic motors which also provide the force which rotates the drum. The apparatus is mounted on the hydraulically operated arm of a tractor-type vehicle and has an arcuate guard which extends over the rear portion of the drum to act as a shield against cuttings.

U.S. Pat. No. 3,044,509 issued to J. Kehler on Jul. 17, 1962, and entitled "Tree Stump Cutter Attachment" discloses a hydraulically operable belt-driven tree stump cutter connected to a tractor and having a cylindrical drum rotating horizontally and having cutting teeth around its periphery. In operation, the power from the tractor provides a means to swing the drum either vertically or horizontally into position to cut tree stumps to ground level.

U.S. Pat. No. 5,158,126 entitled "Improvements In Tree Stump Grinders And Method Of Grinding Tree Stumps"; and U.S. Pat. No. 5,355,910 entitled "Grinder Beam Drive For A Tree Stump Grinder", both issued to W. J. Lang, disclose, as best seen in the Lang '126 patent, a tree stump grinder having a rotating cylindrical drum having a plurality of rows of cutting teeth thereon and an arcuate shield attached to the end of the backhoe arm for preventing the drum from throwing cuttings and other debris against the operator and directing the cuttings toward the ground.

U.S. Pat. No. 4,848,423 issued to Vermeer Manufacturing Co. on Jul. 18, 1989 and entitled "Guard Unit For A Stump Removing Machine Cutter Wheel" discloses a stump grinder having a rotating cylindrical cutting wheel having cutting teeth and a cutter wheel guard attached to a frame member which is movable about the top surface of the stump to be removed. A belt-driven assembly rotates the drum.

U.S. Pat. No. 1,312,450 issued to E. A. McKoy, et al., on Aug. 5, 1919 and entitled "Disintegrating And Conserving Mechanism" discloses a stump grinder that has a rotary cutting drum that is belt-driven and has a guard plate for deflecting cuttings thrown tangentially forward from the drum.

Other patents present in the art are U.S. Pat. No. 5,070,920 issued to Wood Technology, Inc., on Dec. 10, 1991, and entitled "Debarker Knife Assembly"; U.S. Pat. No. 4,180,107 issued to Ram Industries, Inc., on Dec. 25, 1979, and entitled "Stump Eradicator"; all of which are directed to a tree stump grinder, but do not meet the needs of the apparatus of the present invention. In particular, the above-mentioned prior art patents teach a tree stump cutter mounting an arcuate shield that only covers the forward or rearward surface of the cutting drum, not a semi-spherical arcuate shield that covers the entire upper surface of the cutting drum. Thus, the prior art arcuate shields provide inadequate protection to the operator of the apparatus. Furthermore, the above-mentioned prior art patents do not teach a tree stump grinder having a rotating cylindrical cutting drum with an arcuate shield that is positioned a constant radial distance from the drum to reduce the size of the wood shavings. Also, the above-mentioned prior art patents do not teach a method of cutting a tree and grinding and mulching the resulting tree plus the stump, only a method of grinding a tree stump.

Thus, a need exists for an apparatus which can quickly and efficiently cut, chip and mulch the trees and grind and mulch the resulting tree stump, the apparatus having a cylindrical cutting drum with a semi-spherical arcuate shield that covers the forward and rearward surface of the cutting drum and is positioned a constant radial distance from the cutting drum. Also, a need exists for a method of quickly and efficiently cutting, chipping and mulching trees and grinding and mulching the resulting tree stumps.

SUMMARY OF THE PRESENT INVENTION

The preferred embodiment of the apparatus of the present invention solves the aforementioned problems in a straight-forward and simple manner. What is provided is an apparatus and a method for cutting, chipping and mulching trees, in particular trees with no commercial value, and grinding and mulching the resulting tree stumps. The apparatus of the present invention is also suitable for grinding and mulching tree roots and vegetation.

The apparatus of the present invention includes a semi-spherical arcuate shield with a control mount and a foot mount attached to the semi-spherical arcuate shield. A cylindrical drum is mounted within the semi-spherical arcuate shield such that the cylindrical drum will rotate along its horizontal axis within the semi-spherical arcuate shield and the semi-spherical arcuate shield covers the upper forward and rearward surfaces of the cylindrical drum. Means for rotating the cylindrical drum are mounted on the semi-spherical arcuate shield. Debris limiting rings are located on each end of the cylindrical drum. Belt guards are mounted on the debris limiting rings, and end plates are mounted on the belt guards to enclose and protect the means for rotating the cylindrical drum. A plurality of grinding tools is mounted on the outside of the cylindrical drum.

In operation the apparatus is mounted on a self-propelled vehicle, such as a backhoe. The control mount connects to a hydraulic grinder swing cylinder, and the foot mount connects to a stick. The means for rotating the cylindrical drum connects to a power source, such as a hydraulic motor. The self-propelled vehicle moves the apparatus to engage a tree or tree stump. The means for rotating rotates the cylindrical drum having a plurality of grinding tools, thereby grinding into the tree or tree stump. The grinding tools direct tree cuttings from the tree or tree stump towards the ground.

The method of the present invention uses a tree stump grinder mounted on a self-propelled vehicle to grind the upper portion of a tree trunk until substantially all of the tree trunk is ground away. The tree stump grinder is then pushed against the tree trunk at a point above the ground away portion until the upper portion of the tree trunk breaks off, leaving a tree stump. The tree stump grinder then grinds the resulting tree stump down to ground level, depositing the tree cuttings alongside the tree stump.

In view of the above, it is an object of the present invention to provide an apparatus for cutting, chipping and mulching trees and grinding and mulching tree stumps that is safer to operate than the prior art devices.

It is a further object of the present invention to provide such an apparatus for cutting, chipping and mulching trees and grinding and mulching tree stumps that includes a semi-spherical arcuate shield which covers the upper forward and rearward surfaces of a cylindrical drum having a plurality of grinding tools mounted below the semi-spherical arcuate shield.

It is a further object of the present invention to provide an apparatus for cutting, chipping and mulching trees and grinding and mulching tree stumps in which a semi-spherical arcuate shield is mounted a constant radial distance from a cylindrical drum having a plurality of grinding tools.

In view of the above objects it is a feature of the present invention to provide an apparatus for cutting, chipping and mulching trees and grinding and mulching tree stumps that includes a semi-spherical arcuate shield which is mounted at a constant radial distance from a cylindrical drum having a plurality of grinding tools and which covers the upper forward and rearward surfaces of the cylindrical grinder drum.

It is another feature of the present invention to provide an apparatus for cutting, chipping and mulching trees and grinding and mulching tree stumps which includes a plurality of cutting teeth mounted on a cylindrical grinder drum in the apparatus such that when the apparatus is in operation the cutting teeth direct tree cuttings and other debris towards the ground.

It is another feature of the present invention to provide a method for cutting, chipping and mulching trees and grinding and mulching the resulting tree stumps that uses the apparatus of the present invention and includes grinding substantially all of the upper portion of a tree trunk with a cylindrical drum having a plurality of grinding tools, cutting off the upper portion of the tree trunk with the apparatus then chipping, mulching and grinding the resulting tree stump down to ground level with the cylindrical drum having a plurality of grinding tools, and depositing the tree cuttings around the tree stump.

These and other objects, advantages, and features of the present invention will be more fully understood by reference to the written specification and appended drawings.

BRIEF DESCRIPTION OF THE DRAWING

For a further understanding of the nature and objects of the present invention, reference should be had to the following description taken in conjunction with the accompanying drawing in which like parts are given like reference numerals and, wherein:

FIGS. 1, 2 and 7 are directed to the apparatus of the present invention. FIGS. 3–6 are directed to the method of the present invention.

DETAILED DESCRIPTION OF THE PREFERRED EMBODIMENT

Figure 1:
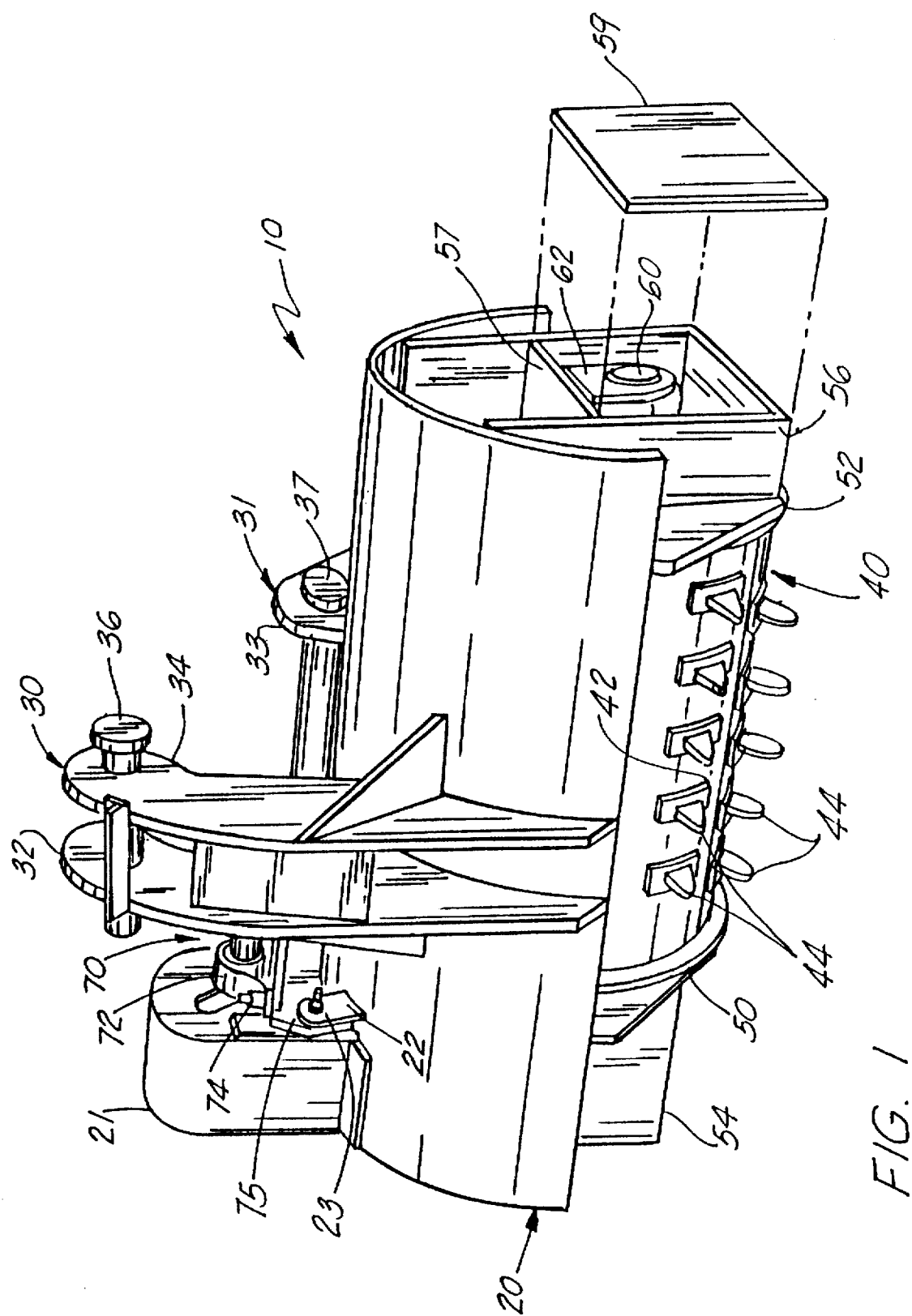
FIG. 1 is a perspective view of the preferred embodiment of the apparatus of the present invention, with the left end plate shown as removed.
Figure 2:
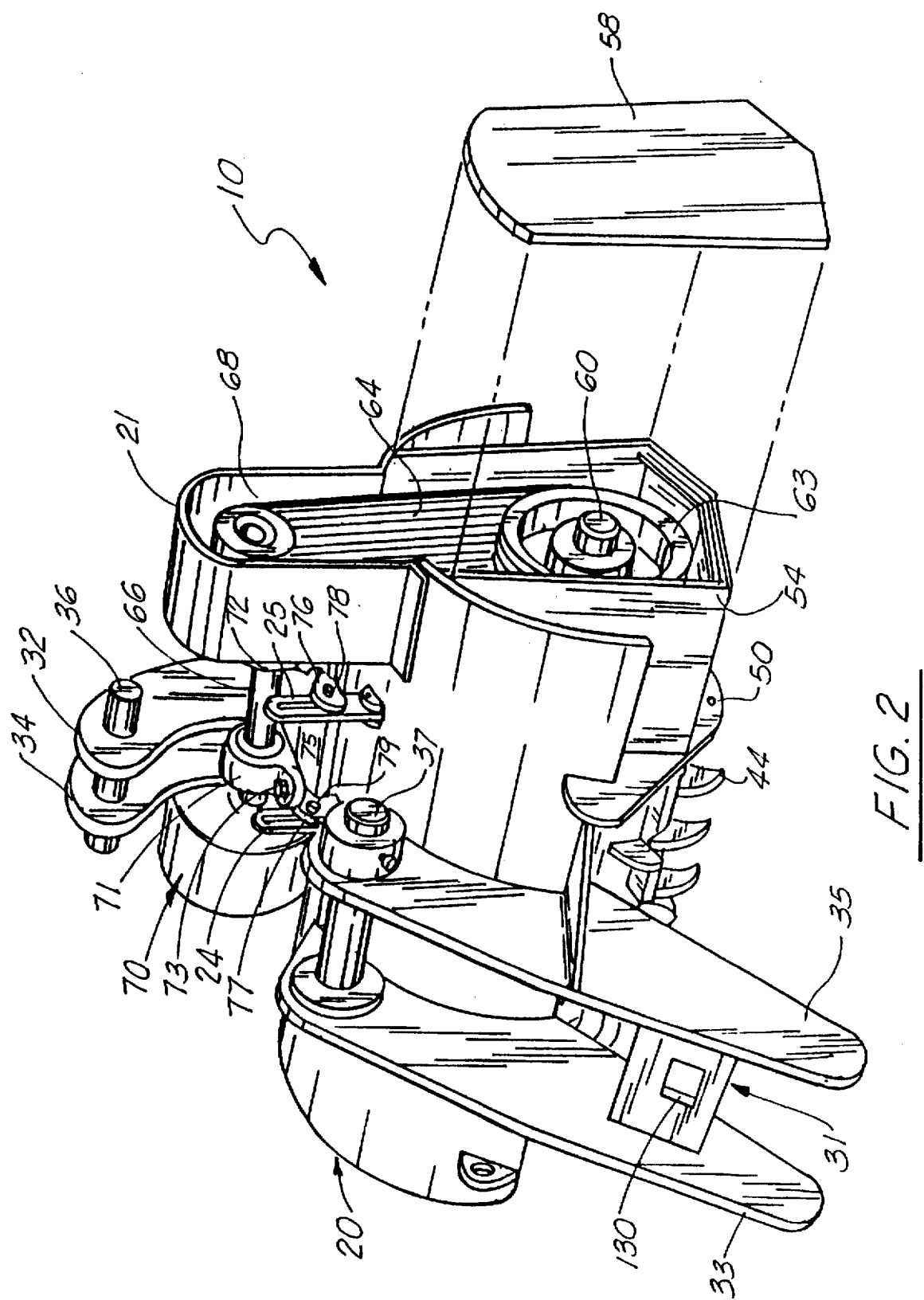
FIG. 2 is a rear view of the embodiment of FIG. 1, with the right end plate shown as removed.

Referring now to the drawings, and in particular FIGS. 1 and 2, the apparatus of the present invention is designated generally by the numeral 10. Apparatus 10 is generally comprised of a semi-spherical arcuate shield 20 with a control mount 30 and a foot mount 31 attached to the arcuate shield 20, a cylindrical drum 40 with cutting teeth 44 mounted below the arcuate shield 20, and belt-driven assembly for rotating the cylindrical drum.

Figure 3:
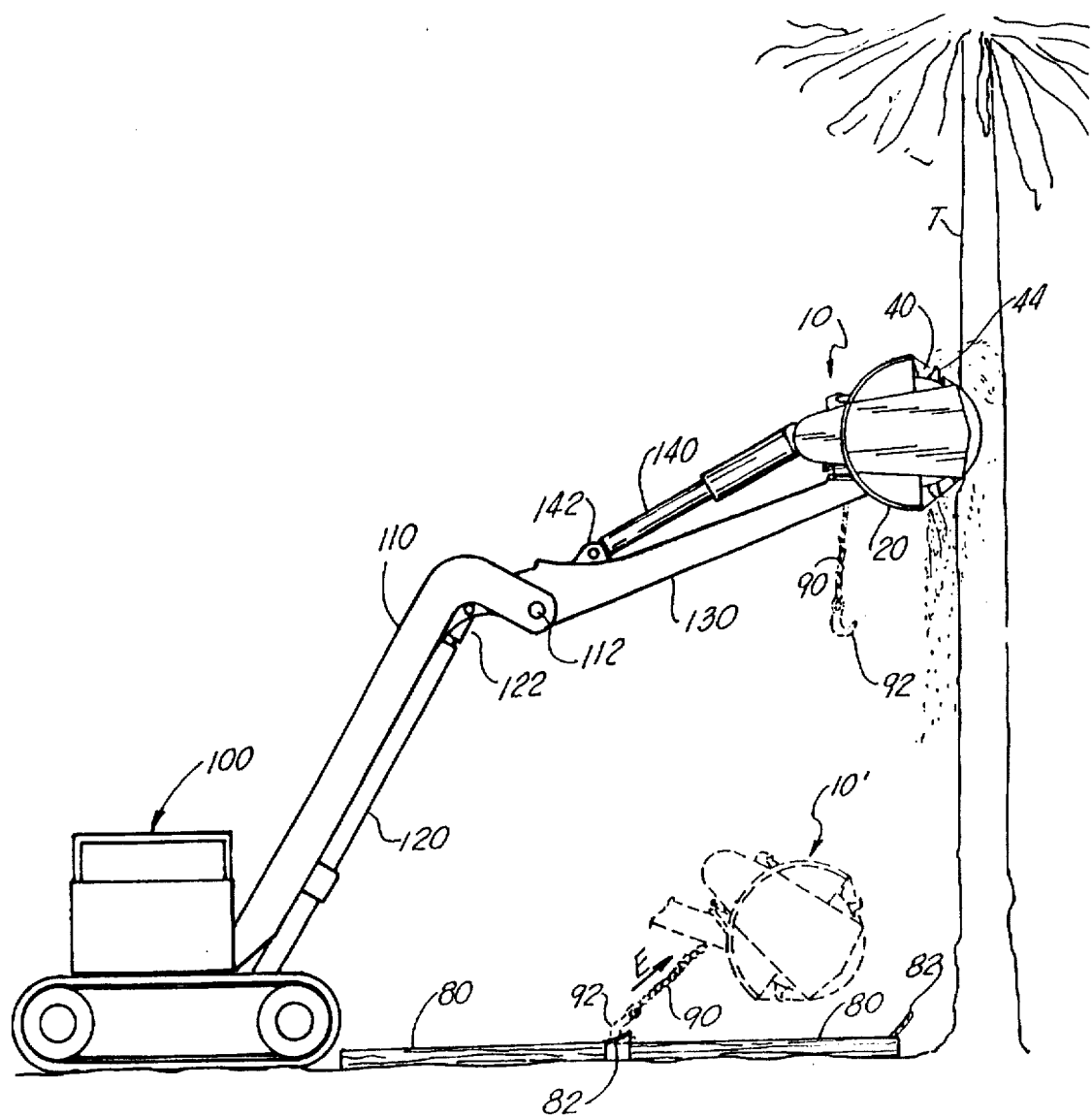
FIG. 3 is a semi-diagrammatic elevational view showing the apparatus of the present invention mounted on a self-propelled vehicle and cutting away at the upper portion of a tree trunk.

Semi-spherical arcuate shield 20 has forward and rearward surfaces. A control mount 30 is attached to the forward surface of the arcuate shield 20 and extends above the arcuate shield 20. The control mount 30 includes a pair of arms, 32 and 34, which run parallel to each other and have bores on their upper ends which are capable of connecting to a self-propelled vehicle, such as a backhoe, by a pivot pin 36. In particular, the control mount 30 would connect to a hydraulic grinder swing cylinder, as best seen in FIG. 3. The foot mount 31 is attached to the rearward surface of the arcuate shield 20 and extends down and behind the arcuate shield 20. The foot mount 31 similarly includes a pair of arms, 33 and 35, which run parallel to each other and have bores in their upper ends which are capable of connecting to a self-propelled vehicle by a pivot pin 37. In particular, the foot mount 31 would connect to a stick, as best seen in FIG. 3. Further, foot mount 31 can be provided with an aperture 130 for securing a chain 90 thereto at its proximate end, chain 90 having a hook 92 secured at its distal end for use as will be described further herein.

Figure 7:
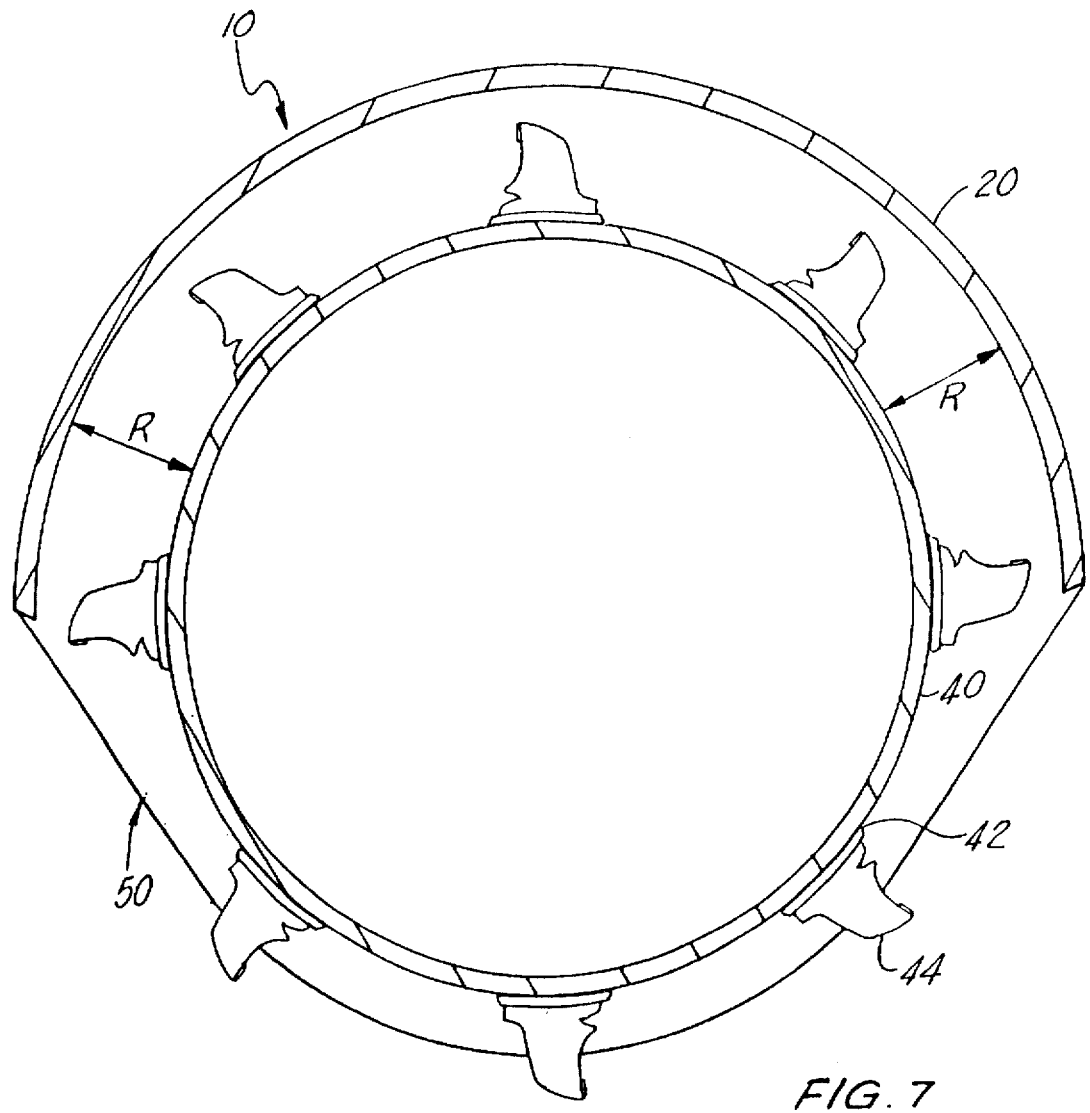

A cylindrical drum 40 is mounted below the semi-spherical arcuate shield 20 such that the arcuate shield 20 covers the upper forward and rearward surfaces of the drum 40. In a preferred embodiment of the apparatus 10, the arcuate shield 20 is mounted a constant radial distance "R" from the drum 40, as best seen in FIG. 7. The drum 40 contains a plurality of sockets through which cutting teeth 44 are inserted. In a preferred embodiment, the cutting teeth 44 are mounted on the drum 40 such that when the drum 40 is rotated (in the direction of ARROW C), the cutting teeth 44 direct tree cuttings and other debris towards the ground. Mounting plates 42 are welded over the cutting teeth 44 to secure the cutting teeth 44 to the drum 40. In a preferred embodiment, the cutting teeth 44 are mounted on the drum 40 in eight equally-spaced alternating rows with each row including five cutting teeth 44. In a more preferred embodiment, the mounting plates 42 are four inches long, three inches wide, one-half inch thick, and curved lengthwise so that the center of the mounting plates 42 is raised five-eighths inch above the lengthwise ends of the mounting plates 42. In an even more preferred embodiment of the apparatus 10, the mounting plates 42 are each mounted to the drum 40 with at least a five-thirty second weld from a 7018 or 7024 welding rod on all four sides of the mounting plates 42.

Debris limiting rings 50 and 52 are located on each end of the cylindrical drum 40 and mounted under the arcuate shield 20. Belt guards 54 and 56 are mounted on debris limiting rings 50 and 52, respectively. End plates 58 and 59 are mounted on belt guards 54 and 56, respectively, to enclose the space between the debris limiting rings 50 and 52, the belt guards 54 and 56, respectively, and the end plates 58 and 59, respectively.

An assembly housing 21 is mounted on top of the arcuate shield 20, as will be discussed further below.

An output shaft 60 is mounted through the drum 40 and the debris limiting rings 50 and 52 to rotate the drum 40 along its horizontal axis. The output shaft 60 is rotatably mounted in an end cap 62 which is mounted on a plate 57. The plate 57 is mounted in belt guard 56. A pulley 63 is mounted on the opposite end of output shaft 60, as best seen in FIG. 2. Pulley 63 engages a belt 64 which extends above the pulley 63 into assembly housing 21. A keyway spline (NOT SHOWN) mounted on shaft 66 engages the belt 64 in the assembly housing 21. A pulley 68 is mounted under housing 21 at the end of shaft 66. Power flex coupler 70 is capable of engaging a power source, such as a hydraulic motor.

Output shaft 60, end cap 62, pulley 63, belt 64, keyway spline, shaft 66, and pulley 68 together comprise a belt-driven assembly for rotating the drum 40.

Shaft 66 is mounted on an assembly plate 75 with bearings 71 and 72. Bearing 71 is secured to assembly plate 75 with a pair of fasteners 73, such as adjusting bolts. Bearing 72 is similarly secured to assembly plate 75 with a pair of fasteners 74, such as bolts, as best seen in FIG. 1. Double prongs 76 and 77 mounted on assembly plate 75 are secured to sliding hinges 25 and 24, respectively, with fasteners 78 and 79, respectively, to secure the assembly plate 75 to the rearward surface of the arcuate shield 20. Fasteners 78 and 79 are bolts. Assembly plate 75 has an extension which is secured to double prong 22 mounted on the arcuate shield 20 by a fastener 23 to secure the assembly plate 75 to the forward surface of the arcuate shield 20. Fastener 23 can be a nut and bolt.

Referring to FIG. 7, a preferred embodiment of the apparatus 10 can be seen. Semi-spherical arcuate shield 20 is mounted a constant radial distance R from the cylindrical drum 40. The eight rows of cutting teeth 44 are equally spaced apart. The debris limiting ring 50 is mounted under the arcuate shield 20. The drum 40 rotates in the direction shown in the arrow below the apparatus 10.

In operation, a power source, such as a hydraulic motor engages pulley 68, causing shaft 66 to rotate. Rotation of shaft 66 causes the belt 64 to rotate, thereby rotating pulley 63. Rotation of pulley 63 causes output shaft 60 to rotate, thus rotating the cylindrical drum 40. Rotation of the drum 40 causes the cutting teeth 44 to cut away at a tree or tree stump. On the left side of the apparatus 10, the debris limiting ring 52, belt guard 56, and end plate 59 enclose and protect the output shaft 60 and end cap 62 from tree cuttings and other debris on the right side of the apparatus 10, the debris limiting ring 50, belt guard 54, and end plate 58 enclose and protect the output shaft 60, pulley 63, and belt 64 from tree cuttings and other debris. Assembly housing 21 encloses and protects the belt 64, keyway spline (NOT SHOWN), and part of shaft 66 from tree cuttings and other debris.

Referring to FIGS. 3–6, and FIG. 3 in particular, the method of the present invention is illustrated. The apparatus 10 of the present invention is mounted on a self-propelled vehicle 100, such as a backhoe. A boom 110 is connected to the vehicle 100 so that the boom 110 may pivot along a vertical axis to move the apparatus 10 up and down. A hydraulic boom cylinder 120 is connected to the boom 110 via pivot pin 122 to move the boom 110 up and down. A stick 130 is connected to the boom 110 via pivot pin 112. Stick 130 is pivotally connected to apparatus 10 via a pivot pin 37 inserted through bores in arms 33 and 35 of foot mount 31. A hydraulic grinder swing cylinder is pivotally connected to stick 130 via pivot pint 142. Hydraulic grinder swing cylinder 140 is pivotally connected to apparatus 10 via a pivot pin 36 inserted through bores in arms 32 and 34 of control mount 30. A power source, such as a hydraulic motor, to power the belt-driven assembly and rotate the cylindrical drum 40 is not shown.

Figures 4, 5:
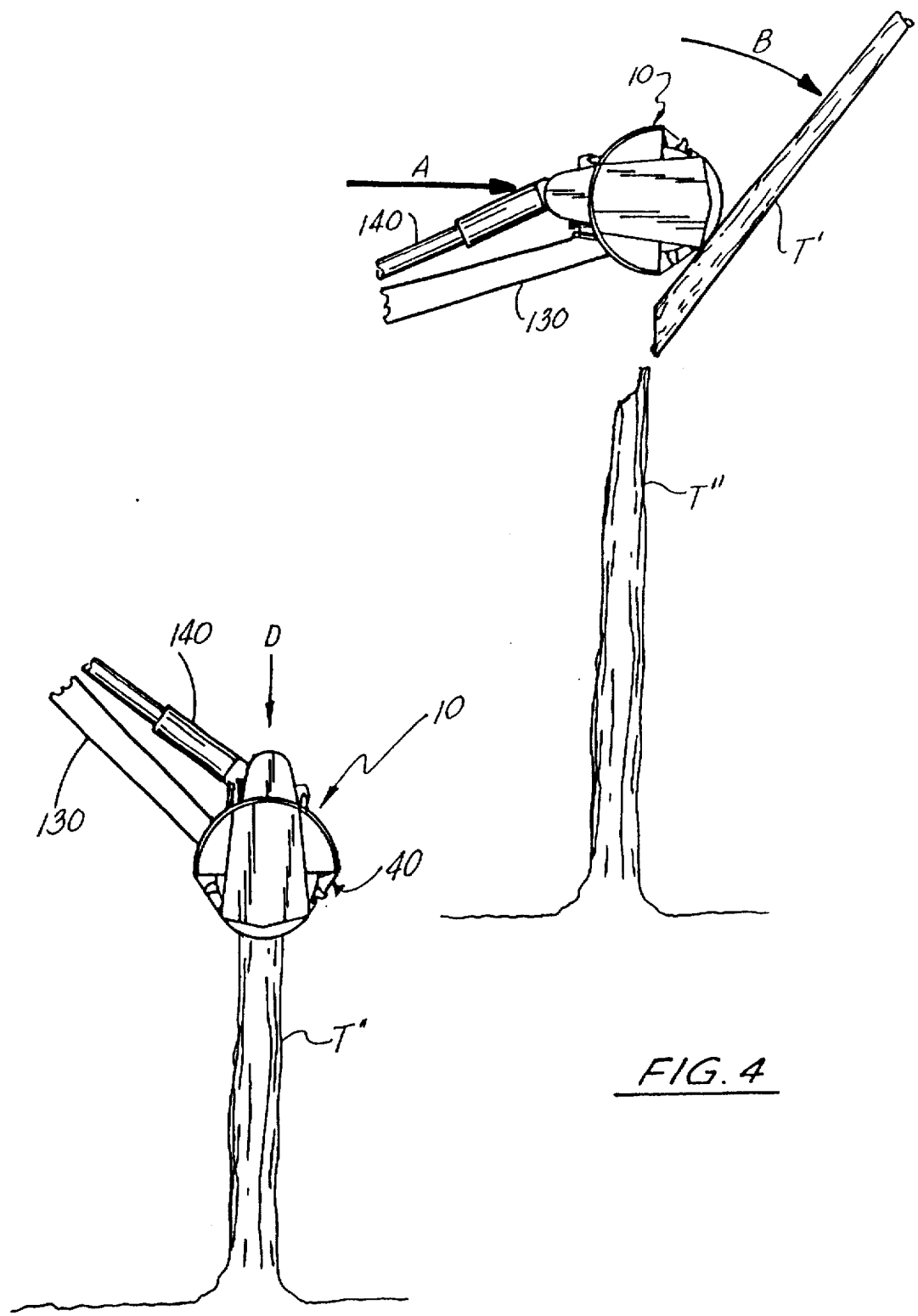
FIG. 4 is a fragmentary side elevational view showing the apparatus of the present invention breaking off the upper portion of the tree trunk of FIG. 3 above the ground away portion of the tree trunk, resulting in a tree stump.
FIG. 5 is a fragmentary side elevational view showing the apparatus of the present invention engaging the tree stump of FIG. 4 for chipping and mulching operations.
Figure 6:
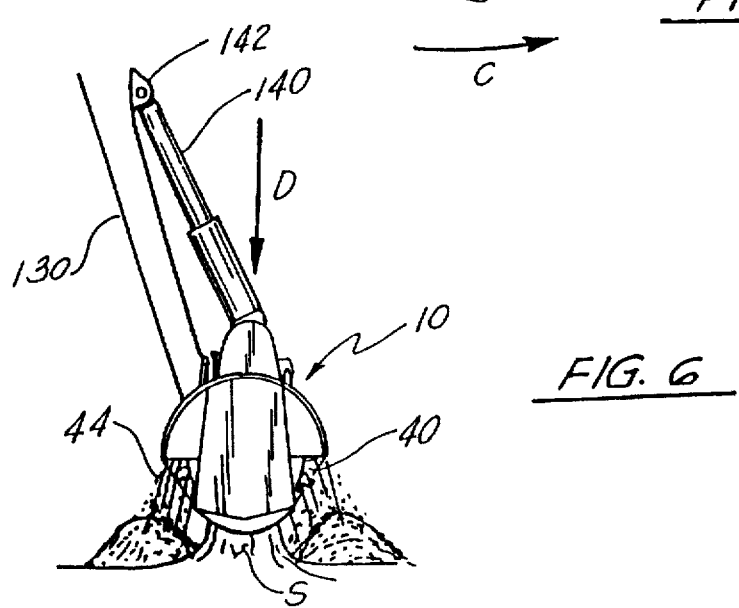
FIG. 6 is a fragmentary side elevational view showing the apparatus of the present invention grinding down the tree stump shown in FIGS. 4 and 5 and depositing the tree cuttings on either side of the tree stump corresponding to the direction that the cutting drum is rotating; and, FIG. 7 is an elevational detail view of the cutter wheel and semi-spherical arcuate shield of the present invention, seen from the right side.

The vehicle 100 positions the apparatus 10 such that the cylindrical drum 40 and cutting teeth 44 engage the upper portion of a tree trunk T. In a preferred embodiment of the method, the apparatus 10 is positioned to engage the tree trunk T at a point that is 90% of the height of the tree trunk (FIGS. 3 and 4 do not show tree trunk T to any scale, but are merely illustrative). The power source then rotates the cylindrical drum 40 in the direction of ARROW C, causing the cutting teeth 44 to grind away at the tree trunk T. The drum 40 is pushed against the tree trunk until the cutting teeth 44 grind away substantially all of the tree trunk at the selected level. The apparatus 10 is then pushed against the tree trunk T (in the direction of ARROW A) at a point above the ground away portion of the tree trunk T, causing the upper portion T' of the tree trunk T to fall off and leave a tree stump T", as best seen in FIG. 4. The apparatus 10 is then positioned such that the drum 40 and the cutting teeth 44 engage the top of the resulting tree stump, as best seen in FIG. 5. The drum 40 is then lowered downwardly (in the direction of ARROW D) toward the tree trunk stump T" until the cutting teeth 44 grind the tree stump down to ground level (or below ground level), as best seen in FIG. 6 where the stump is designated "S". The cutting teeth direct the tree cuttings towards the ground. In the preferred embodiment, the tree cuttings are directed to either side of the tree stump (T" or S) corresponding to the direction that the drum is rotating.

In another preferred embodiment of the method, the apparatus 10 is positioned such that the drum 40 and the cutting teeth 44 engage the upper portion T' of the tree trunk T or stump T" lying on the ground. The drum 40 is then pushed along the upper portion T' of the tree trunk T or stump T" until the cutting teeth 44 grind the upper portion T' of the tree trunk down to wood chips.

Chain and hook 90, 92 may be employed to move drag line mats or skids 80 which support operations in wetlands such as the marsh or swamp. Apparatus 10 is guided by the operator of vehicle 100 to the phantom position 10' of FIG. 3 until hook 92 is secured in end eyelet 82 of free skid 80 and then movement of apparatus 10' upwardly and away from skid 80 (in the direction of ARROW E) will lift the skid 80 so that it can be positioned where the vehicle 100 intends to move. By leap-frogging several free skids 80, vehicle 100 can operate in wetlands which was previously inaccessible to such tree cutting, grinding and mulching operations.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A method for cutting and grinding trees and grinding and mulching the resulting tree stump with a vehicle having a substantially arcuate shield, a boom assembly pivotally attached to said shield, means to pivot said boom assembly relative to said shield, a substantially cylindrical drum with cutting teeth attached to said boom assembly, means carried by said boom assembly to move said drum with cutting teeth up and down to engage a tree, and means to rotate said drum with cutting teeth, comprising the steps of:

(a) grinding substantially all of an area of said upper portion of a tree trunk with said cylindrical drum with cutting teeth;
   (b) pushing said drum against said tree trunk at a point above said area of said upper portion of said tree trunk resulting from said grinding step until said upper portion of said tree trunk breaks off, leaving a tree stump;
   (c) grinding said tree stump resulting from said pushing step down to ground level with said drum with cutting teeth; and,
   (d) depositing the tree cuttings that result from said grinding step (c) around said tree stump as said tree stump is ground down to ground level.

2. The method of claim 1, wherein said pushing step (b) results in said upper portion of said tree trunk falling to the ground, and further comprising the steps of:

(e) grinding the upper portion of said tree trunk lying on the ground down to ground level with said drum with cutting teeth.

3. The method of claim 2, wherein the tree cuttings from said depositing step (d) are deposited substantially on either side of said tree stump corresponding to the direction that said cylindrical drum with cutting teeth is rotating.

4. The method of claim 3, wherein in said grinding step (a) said drum grinds the trunk of a tree at a point that is about 90% of the height of said tree trunk.

5. The method of claim 4, further comprising the step of:

engaging said drum against said upper portion of a tree trunk prior to said grinding step (a).

6. The method of claim 5, further comprising the step of:

rotating said drum with cutting teeth, after said engaging step and prior to said grinding step (a).

7. The method of claim 6, further comprising the step of:

engaging said drum with cutting teeth against the top of said tree stump prior to said grinding step (c).

8. The method of claim 7, further comprising the step of:

engaging said drum with cutting teeth against the upper portion of the tree trunk lying on the ground prior to said grinding step (e).

9. A method for cutting trees and grinding and mulching the resulting tree stump with a vehicle having a substantially semi-spherical arcuate shield, a boom assembly pivotally attached to said shield, means to pivot said boom assembly relative to said shield, a cylindrical drum with cutting teeth attached to the boom assembly, means carried by the boom assembly to move said drum up and down to engage a tree, and means to rotate said drum with cutting teeth, comprising the steps of:

(a) engaging said drum against the upper portion of said tree trunk;
   (b) rotating said drum;
   (c) pushing said drum against said upper portion of said tree trunk until said cutting teeth grind substantially all of the upper portion of said tree trunk;
   (d) pushing said drum against said tree trunk at a point above the ground-away portion of said tree trunk resulting from said pushing step (c) until said upper portion of said tree trunk breaks off, leaving a tree stump;
   (e) engaging said drum against the top of said tree stump;
   (f) pushing said drum against the top of said tree stump until said cutting teeth grind said tree stump resulting from said engaging step (e) down to ground level; and,
   (g) depositing the tree cuttings that result from said pushing step (f) around said tree stump in a direction that said drum is turning, as said tree stump is ground down to ground level or below ground level.

10. The method of claim 9, wherein in said engaging step (a) said cylindrical drum engages the tree trunk at a point that is 90% of the height of the tree trunk.

11. The method of claim 10, further comprising the steps of:

(h) engaging said cylindrical drum against the upper portion of said tree trunk lying on the ground; and,
   (i) moving said cylindrical drum against the upper portion of said tree trunk and stump lying on the ground until said cutting teeth grind the upper portion of said tree trunk and stump down to wood chips.

* * * * *